United States Patent [19]

Freyschlag et al.

[11] 3,760,004

[45] Sept. 18, 1973

[54] PRODUCTION OF DERIVATIVES OF OMEGA-HYDROXYTIGLALDEHYDE

[75] Inventors: Herwig Freyschlag, Ludwigshafen, Rhine; Fritz Stolp, Limburgerhof, Upper Palatine; Werner Reif; Horst Pommer, both of Ludwigshafen, Rhine, all of Germany

[73] Assignee: Badische Anilin- & Soda-Fabrik Aktiengesellschaft, Ludwigshafen/Rhine, Germany

[22] Filed: Sept. 8, 1969

[21] Appl. No.: 856,186

Related U.S. Application Data

[63] Continuation-in-part of Ser. No. 390,714, Aug. 19, 1964, abandoned.

[30] Foreign Application Priority Data

Aug. 23, 1963 Germany .......................... B 73234

[52] U.S. Cl.......... 260/615 A, 260/601 H, 260/491, 260/602
[51] Int. Cl............................................. C07c 43/30
[58] Field of Search............ 260/602, 601 H, 615 A, 260/491

[56] References Cited
UNITED STATES PATENTS
3,347,930  10/1967  Freyschlag et al................. 260/602

FOREIGN PATENTS OR APPLICATIONS
1,188,577  3/1965  Germany........................... 260/602

Primary Examiner—Bernard Helfin
Assistant Examiner—R. H. Liles
Attorney—Johnston, Root, O'Keeffe, Keil, Thompson and Shurtleff

[57] ABSTRACT

Production of 4-halogen-2-formylbutene-(2) or its lower alkyl acetals or lower fatty acid acylates by the action of certain halogenating agents on 2-formyl-2-hydroxybutene-(3) or its acetals or its acylates in the presence of tertiary amines such as trialkyl amines or N-alkyl derivatives of nitrogen containing heterocyclic compounds such as piperidine, morpholine, piperazine or similar compounds having 5 to 6 ring members.

8 Claims, No Drawings

PRODUCTION OF DERIVATIVES OF OMEGA-HYDROXYTIGLALDEHYDE

The present application is a continuation-in-part of application Ser. No. 390,714 which was filed on Aug. 19, 1964, now abandoned.

Omega-hydroxytiglaldehyde ethers and esters have great industrial importance because they serve for example as initial materials for the synthesis of vitamin A and its derivatives. Two methods have been described for the production of hydroxytiglaldehyde and one of its derivatives, but both give extremely low yields and require several steps.

We have found that derivatives of omega-hydroxytiglaldehyde (4-hydroxy-2-formylbutene-(2)) are obtained in good yields and in an advantageous way by treating 2-formyl-2-hydroxybutene-(3) or an acetal or acylate thereof with thionyl chloride, thionyl bromide or phosgene in the presence of a tertiary amine.

The new process gives very high yields and it is a particularly favorable feature that the derivatives of omega-hydroxytiglaldehyde formed in this way exhibit outstanding purity and are present uniformly or almost uniformly in the trans form.

The tertiary amines may be e.g. trialkyl amines, N-alkyl derivatives of nitrogen containing heterocyclic compounds such as piperidine, morpholine, piperazine or similar compounds having 5 to 6 ring members. The term "tertiary amines" as used in this specification is intended to include compounds in which the nitrogen is bound to a carbon atom by a double linkage as in quinoline and pyridine.

Those tertiary amines are particularly suitable in which the substituents shield the nitrogen atom as little as possible by their size and their type and condition of combination. Thus the activity of tri-n-butylamine is less than that of trimethylamine, and the activity of quinoline is less than that of pyridine. The fact that bis-aza-bicyclooctane has a very good activity whereas N,N-dimethylpiperazine has very little activity may serve to explain the above statement. Examples of effective tertiary amines are: trimethylamine, ethyldimethylamine, diethylmethylamine, dipropylmethylamine, bis-aza-bicyclooctane, N-methylmorpholine, 1,3,5-trimethylmorpholine, N-methylpiperidine and pyridine.

The heterocyclic tertiary amines include heterocyclic compounds containing five or six ring members including a nitrogen atom connected by two single bonds to adjacent ring carbon atoms and having a methyl substituent, the ring carbon atoms either being otherwise unsubstituted or being substituted solely by one or more methyl groups; heterocyclic compounds containing five or six ring members including a nitrogen atom connected by a single bond and a double bond to adjacent ring carbons, the ring atoms either being otherwise unsubstituted or being substituted solely by one or more methyl groups: quinoline; or bis-aza-bicyclooctane.

The tertiary amines serving as catalysts in the process of the present invention may act at the same time as the reaction medium. It is also possible to use other solvents, for example aliphatic or aromatic hydrocarbons or chlorinated hydrocarbons, such as petroleum ether, ligroin, benzene, toluene or methylen chloride, either along or together with the tertiary amines used as solvents.

The amounts of solvent used may be varied within wide limits but it is preferred to use the tertiary amines, when they are used together with other solvents, in amounts of about one equivalent or more of the tertiary amine with reference to the 2-formyl-2-hydroxybutene-(3) or its hydrate derivative. By hydrate derivative we mean the acetals and acylates. For example, in mixtures of the tertiary amine with other solvents, it is possible to use one mole of the tertiary amine (with reference to 2-formyl-2-hydroxybutene-(3)) in addition to more or less large amounts of other solvents. It is recommended that a reaction medium as free as possible from water be used, but it is also possible to start from a moist reaction medium.

The process is usually carried out under atmospheric pressure or a slight superatmospheric pressure if phosgene or a gaseous amine is being passed in. It is also possible to work in pressure vessels under superatmospheric pressure. The other halogenating agents specified are advantageously used in a slight molar excess. One embodiment of the process consists for example in introducing a mixture of 2-formyl-2-hydroxy-butene-(3) or a hydrate derivative thereof and of the tertiary amine into a solvent, for example benzene, and passing in phosgene or allowing thionyl chloride to flow in slowly at room temperature. In another embodiment, a mixture of the tertiary amine with the halogenating agent may be prepared and the said butene derivative or a hydrate derivative thereof then added. The process according to this invention may generally be carried out well in the temperature range of the laboratory or plant. If desired, the reaction may also be carried out at a temperature within the range from −30° C to +120° C or even outside this range. At room temperature, for example, the reaction proceeds almost instantaneously. In order to ensure that the highest possible degree of conversion is achieved it is frequently advantageous not to work up the reaction mixture immediately upon bringing the reactants together, but to allow it to stand for some time or to agitate it, e.g. by stirring. For this 2 or 3 or 5 hours are enough.

Although the advantages of the new process are evident with all of the said initial substances, lower acetals of 2-formyl-2-hydroxybutene-(3) are preferred, for example the acetals derived from common aliphatic alcohols. For practical reasons, the dimethyl or diethyl acetals are chosen. As acylates, those are preferred which are derived from common aliphatic acids, the lower fatty acids.

By the process there is formed from 2formyl-2-hydroxybutene-(3), by rearrangement of the hydroxyl group and its replacement by halogen, a derivative of tiglaldehyde in accordance with the following equation:

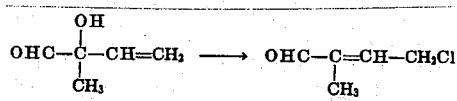

By reason of the high field effect of the formyl group and also its hydrate derivatives, it was not to be foreseen that it would be possible, by allyl displacement, to displace the hydroxyl in alpha-position to the formyl group, while halogenating it, into the omega-position, i.e. to the terminal carbon atom. The result of the process according to the invention is also impressive because it is known that in the reaction of allyl alcohols with for example thionyl chloride in dilute ethereal solution, the isomeric chloride formed by allyl displacement is only the sole reaction product when the concentration of the solution is chosen less than 1-molar. At higher concentrations or when using solvents other than ether, whose use is of little advantage industrially, mixtures of isomers are formed. When using phosgene alone as the chlorinating agent, a mixture of isomeric allyl chlorides is also always obtained from allyl alcohols.

It was therefore not to be foreseen that by using thionyl chloride, thionyl bromide or phosgene in the presence of a tertiary amine or a mixture of tertiary amines in accordance with this invention, a considerable contribution to the art would be made because halogenation of the initial material now proceeds in such a way that the product halogenated in omega-position is obtained practically exclusively.

For the use of the halogenated tiglaldehyde or its acetal or acylate in industrial syntheses, for example for the production of vitamin A, it is recommended that the products obtainable according to this invention should be converted by reaction in conventional manner with metal salts of fatty acids or with alcoholates into derivatives of the corresponding omega-hydroxy compounds. It is advantageous to choose for this purpose alkali salts of low molecular weight fatty acids having 2 to 18 carbon atoms. Aromatic carboxylic acids may however be used in the same way with good results. Instead of fatty acids, with which ester derivatives of tiglaldehyde are obtained, alcoholates may be used and these give ether derivatives of tiglaldehyde. Alkali salts of low molecular weight alcohols having 1 to 6 carbon atoms are advantageous, but aromatic alcohols including the salts of phenol may be used with equally good results.

2-Formyl-2-hydroxybutene-(3) may be obtained according to British Patent Specification No. 871,804 by partial hydrogenation of 2-formyl-2-hydroxybutene-(3) and this in turn may be obtained by ethinylation (reaction with acetylene) of methylglyoxal acetal. The latter may be obtained by the process described in German Patent Specification No. 1,008,276.

The invention is further illustrated by the following Examples, in which parts are by weight.

EXAMPLE 1

120 parts of phosgene is passed into a solution of 71 parts of trimethylamine in 660 parts of methylene chloride at −20° C. Then while stirring vigorously, 146 parts of 1,1-dimethoxy-2-methylbutene-(3)-ol-(2) is dripped in at the same temperature. The whole is stirred for another hour at −20° C and for another two hours at room temperature. 400 parts of water is then added and the aqueous phase is separated. The organic phase is stirred for five hours with 400 parts of 5 percent aqueous sulfuric acid. The aqueous layer is separated, the solvent is evaporated off and the residue is rectified. 89 parts of 4-chloro-2-formylbutene-(2) is obtained having a boiling point of 41° to 43° C at 0.5 mm Hg and a refractive index $n_D^{20} = 1.4863$.

EXAMPLE 2

120 parts of phosgene is passed at −20° C into a solution of 18 parts of dimethylformamide and 59 parts of trimethylamine in 550 parts of toluene and then 146 parts of 1,1-dimethoxy-2-methylbutene-(3)-ol-(2) is dripped in at the same temperature. The whole is stirred for another hour at the same temperature and for two hours at room temperature. 400 parts of water is then added and the aqueous phase is separated. The toluene solution is stirred for five hours with 400 parts of 5 percent aqueous sulfuric acid. The aqueous layer is separated, the toluene is evaporated under subatmospheric pressure and the residue is rectified. 73 parts of 4-chloro-2-formylbutene-(2) is obtained.

EXAMPLE 3

120 parts of phosgene is passed at −20° C into a solution of 88 parts of dimethylethylamine and 146 parts of 1,1-dimethoxy-2-methylbutene-(3)-ol-(2) in 500 parts of toluene. The temperature is allowed to rise to room temperature and the whole is stirred for another two hours. If the reaction mixture is still acid, it is made alkaline by adding more dimethylethylamine. Deposited salt is suction filtered while excluding moisture and the filtrate is concentrated under subatmospheric pressure. By rectifying the residue, 109 parts of 4-chloro-2-dimethoxymethylbutene-(2) is obtained having a boiling point (at 1.0 mm Hg) of 43.0° C and a refractive index $n_D^{20} = 1.4512$.

EXAMPLE 4

100 parts of diethylmethylamine is dripped at −20° C into a solution of 146 parts of 1,1-dimethoxy-2-methylbutene-(3)-ol-(2) and 120 parts of phosgene in 860 parts of toluene. The whole is worked up as described in Example 3 and 68 parts of 4-chloro-2-dimethoxymethylbutene-(2) is obtained.

EXAMPLE 5

95 parts of pyridine is dripped at −20° C into a solution of 120 parts of phosgene in 700 parts of carbon tetrachloride and then 146 parts of 1,1-dimethoxy-2-methylbutene-(3)-ol-(2) is dripped in. The temperature is allowed to rise and the whole is then stirred for another three hours at room temprature. 400 parts of water is then added. The aqueous phase is separated and the organic phase is stirred for 5 hours with 5 percent aqueous sulfuric acid. The aqueous layer is separated, the solvent is evaporated and the residue is rectified. 78 parts of 4-chloro-2-formylbutene-(2) is obtained.

EXAMPLE 6

142 parts of thionyl chloride is dripped into a solution of 95 parts of pyridine in 860 parts of toluene at room temperature with slight cooling and then 146 parts of 1,1-dimethoxy-2-methylbutene-(3)-ol-(2) is dripped in. The whole is stirred for three hours at room temperature. 400 parts of water is then added and the aqueous phase is separated. The organic phase is stirred for five hours with 5 percent aqueous sulfuric acid. The aqueous phase is separated. A solution of 75 parts of 4-chloro-2-formylbutene-(2) (determined infrared-spectroscopically) in toluene is obtained which may be further reacted without additional purification.

EXAMPLE 7

120 parts of phosgene is passed at −20° C into a solution of x parts of a tertiary amine in 600 parts of toluene. Then with vigorous stirring at −20°C, 146 parts of 1,1-dimethoxy-2-methylbutene-(3)-ol-(2) is dripped in. The whole is stirred for another hour at −20° C and for another three hours at room temperature. 400 parts of water is then added and the aqueous layer is separated. The organic phase is stirred for 5 hours with 5 percent sulfuric acid. The aqueous layer is separated, the solvent is evaporated under subatmospheric pressure and the residue is rectified. $y$ parts of 4-chloro-2-formylbutene-(2) is obtained.

a. When bis-aza-bicyclooctane is used as the tertiary amine, $x = 134$ and $y = 71$.

b. When N-methylmorpholine is used as the tertiary amine, $x = 121$ and $y = 48$.

c. When N-methylpiperidine is used as the tertiary amine, $x = =120$ and $y = 80$.

EXAMPLE 8

192 parts of pyridine is dripped into a solution of 240 parts of phosgene in 860 parts of toluene at 0° C and then 292 parts of 1,1-dimethoxy-2-methylbutene-(3)-ol-(2) is dripped in at +20° C. The whole is stirred for another 3 hours. 800 parts of water is added, the aqueous phase is separated and the whole is stirred for five hours with 500 parts of a 5 percent aqueous sulfuric acid. The aqueous layer is separated and the toluene evaporated at subatmospheric pressure. The residue is rectified. 158 parts of 4-chloro-2-formylbutene-(2) is obtained having a boiling point (at 0.5 mm Hg) of 41° to 43° C and a refractive index $n_D^{20} = 1.4863$.

EXAMPLE 9

If the 192 parts of pyridine in Example 8 be replaced by 310 parts of 1,3,5-trimethylmorpholine, 143 parts of 4-chloro-2-form-ylbutene-(2) is obtained having the same boiling point.

EXAMPLE 10

120 parts of phosgene is incorporated into a solution of 72 parts of trimethylamine in 500 parts of toluene at −15° C while stirring. 200 parts of crude 1,1-diacetoxy-2-hydroxy-2-methylbutene-(3) is then dripped in at such a rate that the temperature does not exceed +15° C. The reaction mixture is stirred for another 2 hours at room temperature and, after 500 parts of water has been added, for another 3 hours. The organic layer is then separated and the solvent is evaporated under subatmospheric pressure. 101 parts of crude 4-chloro-2-formylbutene-(2) is obtained as residue. It may be further reacted without additional purification

We claim:

1. A process for the production of derivatives of omega-hydroxytiglaldehyde (4-hydroxy-2-formylbutene) (2)) which comprises: halogenating a member selected from the group consisting of 2-formyl-2-hydroxybutene-(3) and a di-lower alkyl acetal and a lower fatty acid acylate thereof, with a halogenating agent selected from the group consisting of thionyl chloride, thionyl bromide and phosgene in the presence of a tertiary amine selected from the group consisting of (a) trialkylamines wherein the alkyl groups respectively have 1 to 4 carbon atoms, (b) heterocyclic compounds selected from the group consisting of N-methylmorpholine, 1,3,5-trimethylmorpholine, N-methylpiperidine and pyridine and (c) bis-aza-bicyclooctane.

2. The process as claimed in claim 1 wherein the dimethyl acetal of 2formyl-2-hydroxybutene-(3) is used as the initial material.

3. The process as claimed in claim 1 wherein phosgene is used as the halogenating agent and trimethylamine as the tertiary amine.

4. The process as claimed in claim 1 carried out in a solvent.

5. A process as claimed in claim 1 wherein said tertiary amine is a trialkylamine in which the alkyl groups are methyl or ethyl.

6. A process as claimed in claim 1 wherein said tertiary amine is bis-aza-bicyclooctane.

7. A process as claimed in claim 1 wherein said tertiary amine is trimethylamine.

8. A process as claimed in claim 1 wherein said trialkyl amine is selected from the group consisting of trimethylamine, ethyldimethylamine, diethylmethylamine and dipropymethylamine.

* * * * *